United States Patent
Park et al.

(10) Patent No.: US 6,952,235 B2
(45) Date of Patent: Oct. 4, 2005

(54) APPARATUS AND METHOD FOR CONTROLLING BLACK STRETCH OF VIDEO SIGNAL

(75) Inventors: Se-woong Park, Suwon-si (KR); Byeong-il Min, Anyang-si (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 525 days.

(21) Appl. No.: 10/186,395

(22) Filed: Jul. 1, 2002

(65) Prior Publication Data

US 2003/0071916 A1 Apr. 17, 2003

(30) Foreign Application Priority Data

Oct. 13, 2001 (KR) .......................... 2001-63215

(51) Int. Cl.[7] .......................... H04N 5/68; H04N 5/16
(52) U.S. Cl. .......................... 348/379; 348/691; 348/678
(58) Field of Search .......................... 348/379, 671, 348/673, 678, 690, 691, 687, 674; 345/690, 77; 382/274; H04N 5/68, 5/16

(56) References Cited

U.S. PATENT DOCUMENTS

| | | | | |
|---|---|---|---|---|
| 5,257,108 A | * | 10/1993 | Muraoka | 348/674 |
| 5,422,680 A | * | 6/1995 | Lagoni et al. | 348/674 |
| 5,515,113 A | * | 5/1996 | Takeshima | 348/687 |
| 5,548,341 A | * | 8/1996 | Klink et al. | 348/674 |
| 6,600,519 B1 | * | 7/2003 | Hwang | 348/673 |

FOREIGN PATENT DOCUMENTS

KR 2001-0067348 A 7/2001

* cited by examiner

*Primary Examiner*—Sherrie Hsia
(74) *Attorney, Agent, or Firm*—Sughrue Mion, PLLC

(57) ABSTRACT

An apparatus and method for adaptively varying a black stretch control range and a gain according to a mean level of a video signal to control black stretch of the video signal. According to the apparatus and method, the slope and range of black stretch are varied depending on the mean of the input video signal, so black stretch compensation can be adaptively performed depending on the brightness of a screen. Particularly, black stretch compensation can be effectively performed on a dark screen.

11 Claims, 4 Drawing Sheets

APPARATUS AND METHOD FOR CONTROLLING BLACK STRETCH OF VIDEO SIGNAL

BACKGROUND OF THE INVENTION

1. Field of the Invention

The present invention relates to an apparatus and method for controlling black stretch in a video signal processing system, and more particularly, to an apparatus and method for adaptively varying a black stretch control range and a gain according to a mean level of a video signal to control black stretch of the video signal. The present application is based on Korean Patent Application No. 2001-63251, filed Oct. 13, 2001, which is incorporated herein by reference.

2. Description of the Related Art

Generally, a dark video signal is more sensitive than a bright video signal in a video signal processing system, and a screen looks like it is floating when there is no video signal in a black area. To overcome this phenomenon, the black level of a dark video signal is stretched using a black stretch control apparatus to enhance contrast.

As shown in FIG. 1, a conventional black stretch control apparatus includes a minimum detector 110, a gain calculator 120, a comparator 130, a black stretch calculator 140, and a multiplexer 150.

The minimum detector 110 detects a minimum value of an input video signal Yi in units of frames. The minimum may be obtained by performing horizontal and vertical filtering on the input video signal Yi or sequentially comparing luminance levels of individual pixels.

Then, the gain calculator 120 calculates a slope of black stretch using the detected minimum value and a' tilt value TILT corresponding to a maximum of a predetermined black stretch control range. In other words, as shown in FIG. 2, the slope of a line S0' is calculated on the basis of the minimum value. In FIG. 2, a line S0 shows input/output characteristics when gain is 1 before black stretch is performed.

Next, the black stretch calculator 140 calculates a black-stretched signal by multiplying the input video signal Yi by the slope calculated by the gain calculator 120.

The comparator 130 compares the input video signal Yi with the tilt value TILT and outputs a "high" level signal if the input video signal Yi is less than the tilt value TILT. If the input video signal Yi is not less than the tilt value TILT, the comparator 130 outputs a "low" level signal.

The multiplexer 150 receives the black-stretched signal from the black stretch calculator 140 and the input video signal Yi. If the signal applied from the comparator 130 is a "high" level signal, the multiplexer 150 outputs the black-stretched signal. If the signal applied from the comparator 130 is a "low" level signal, the multiplexer 150 outputs the input video signal Yi.

Accordingly, if the input video signal Yi is less than the tilt value TILT, the black level of the input video signal Yi is stretched. If the input video signal Yi is not less than the tilt value TILT, the input video signal Yi is output as it is without performing black stretch. Therefore, contrast can be enhanced due to black stretch on a bright screen where the mean of the input video signal Yi is greater than the tilt value TILT.

However, according to such conventional black stretch control apparatus, a dark screen where the mean of the input video signal Yi is less than the tilt value TILT gets darker due to black stretch.

SUMMARY OF THE INVENTION

To solve the above-described problems, it is an object of the present invention to provide an apparatus and method for varying the slope and the range of black stretch according to the mean of an input video signal to adaptively control black stretch of the input video signal.

To achieve the above object of the present invention, there is provided an apparatus for controlling black stretch of a video signal. The apparatus includes a minimum detector for detecting a minimum value MIN of an input video signal Yi in predetermined image units; a mean calculator for calculating a mean value of the input video signal Yi in the predetermined image units; and a black stretch controller for varying the range of black stretch using the mean value, obtaining the slope of black stretch using the varied range of black stretch and the minimum value MIN, and performing black stretch on the input video signal Yi using the slope of black stretch.

The black stretch controller includes a tilt signal generator for comparing an initial tilt value TILT for determining the range of black stretch with the mean value calculated by the mean calculator, outputting the initial tilt value TILT as a real tilt value TILT_REAL when the initial tilt value TILT is less than the mean, outputting the mean value as a real tilt value TILT_REAL when the initial tilt value TILT is not less than the mean, comparing the input video signal Yi with the real tilt value TILT_REAL, generating a control signal as a first level when the input video signal is less than the real tilt value TILT_REAL, and generating a control signal as a second level when the input video signal Yi is not less than the real tilt value TILT_REAL; a gain calculator for receiving the minimum value MIN detected by the minimum detector and the real tilt value TILT_REAL determined by the tilt signal generator and calculating a real gain GAIN_REAL corresponding to the slope of black stretch according to a first predetermined operation; a black stretch calculator for receiving the input video signal Yi, the real gain GAIN_REAL, and the real tilt value TILT_REAL and generating a black-stretched signal Yi' according to a second predetermined operation; and a multiplexer for receiving the input video signal Yi and the black-stretched signal Yi', outputting the black-stretched signal Yi' in response to the control signal generated as the first level, and outputting the input video signal Yi in response to the control signal generated as the second level.

There is also provided a method of controlling black stretch of a video signal including the steps of (a) calculating a minimum value MIN and a mean value of an input video signal Yi in predetermined image units; (b) determining the range of black stretch by varying a real tilt value TILT_REAL using the mean value; (c) obtaining the slope of black stretch using the range of black stretch determined in step (b) and the minimum value MIN; and (d) performing black stretch on the input video signal Yi using the slope of black stretch obtained in step (c).

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
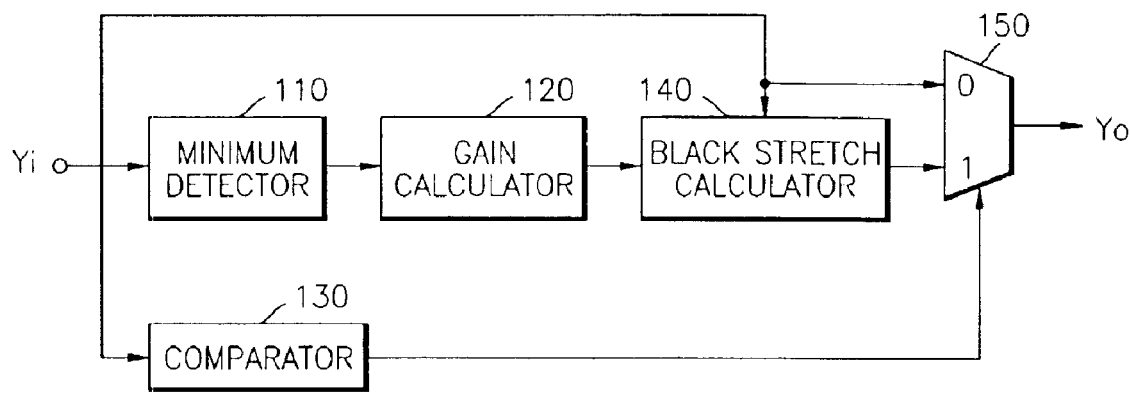
FIG. 1 is a block diagram of a conventional apparatus for controlling black stretch of a video signal.
Figure 2:
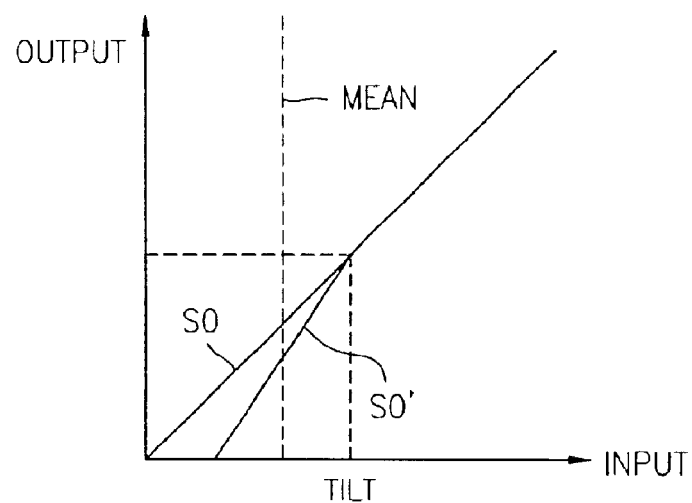
FIG. 2 is a graph of the gain of conventional black stretch.
Figure 3:
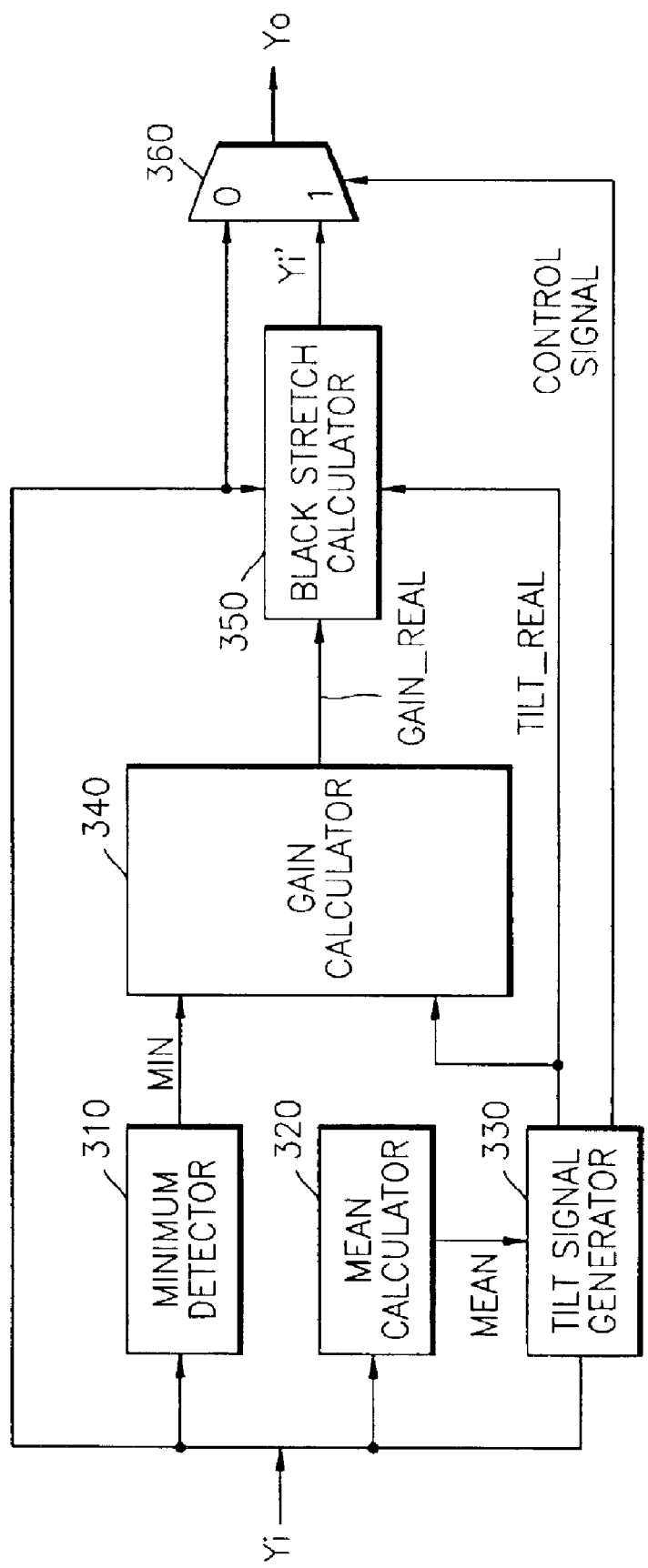
FIG. 3 is a block diagram of an apparatus for controlling black stretch of a video signal according to an embodiment of the present invention.

As shown in FIG. 3, an apparatus for controlling black stretch of a video signal according to an embodiment of the present invention includes a minimum detector 310, a mean calculator 320, a tilt signal generator 330, a gain calculator 340, a black stretch calculator 350, and a multiplexer 360.

A circuit structure including the tilt signal generator 330, the gain calculator 340, the black stretch calculator 350, and the multiplexer 360 is referred to as a black stretch controller in the present invention.

The minimum detector 310 detects a minimum value of an input video signal Yi in units of frames or fields. The minimum may be obtained by performing horizontal and vertical filtering on the input video signal Yi or sequentially comparing brightness levels of individual pixels.

The mean calculator 320 calculates a mean value of the input video signal Yi in units of frames or fields.

Figure 4A:
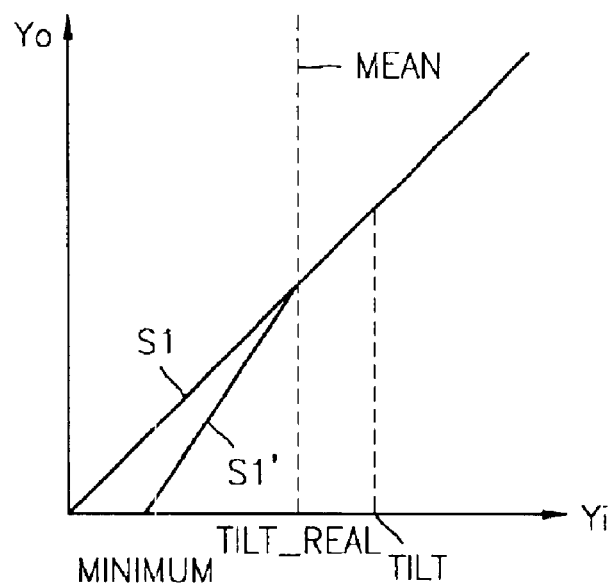
FIG. 4A is a graph of the gain of black stretch according to the present invention when a mean is less than an initial tilt value.
Figure 4B:
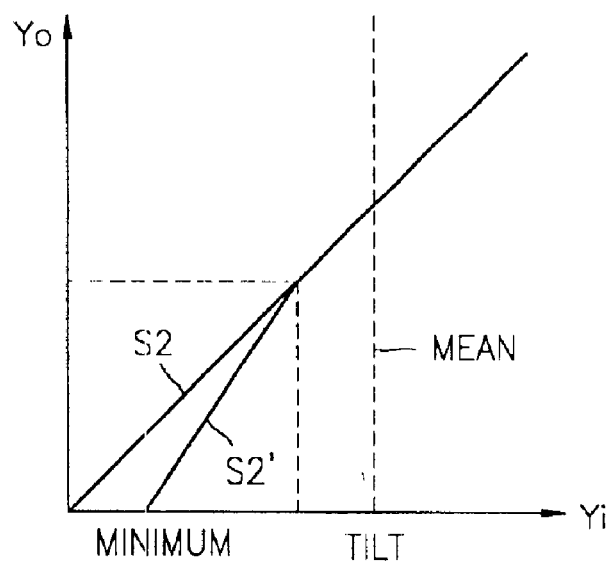
FIG. 4B is a graph of the gain of black stretch according to the present invention when the mean is greater than or equal to the initial tilt value.

The tilt signal generator 330 includes a plurality of comparators and data storage units and stores an initial tilt value TILT determining the range of black stretch in the data storage units. The tilt value TILT indicates a threshold value determining the range of black stretch of a video signal and is initially determined as a specification to which the apparatus is designed. Next, the tilt signal generator 330 compares the initial tilt value TILT with the mean value input from the mean calculator 320. If the initial tilt value TILT is less than the mean value, the tilt signal generator 330 determines and outputs the initial tilt value TILT as a real tilt value TILT_REAL, as shown in FIG. 4B. If the initial tilt value TILT is greater than or equal to the mean value, the tilt signal generator 330 determines and outputs the mean value as a real tilt value TILT_REAL, as shown in FIG. 4A. In other words, the real tilt value TILT_REAL actually determining the range of black stretch is varied depending on the magnitude of the mean value and is then output to the gain calculator 340 and the black stretch calculator 350. In addition, the tilt signal generator 330 compares the input video signal Yi with the real tilt value TILT_REAL, generates a control signal as a first level when the input video signal Yi is less than the real tilt value TILT_REAL, and generates a control signal as a second level when the input video signal Yi is not less than the real tilt value TILT_REAL.

The gain calculator 340 receives the minimum value MIN detected by the minimum detector 310 and the real tilt value TILT_REAL determined by the tilt signal generator 330 and calculates the slope of black stretch which is used for controlling black stretch, that is, a gain used for black stretch according to Formula (1).

$$\text{Gain} = \alpha * \text{TILT\_REAL}/(\text{TILT\_REAL} - \text{MIN}) \quad (1)$$

Here, α is a constant.

The gain calculated according to Formula (1) is generated as a real gain GAIN_REAL limited not to exceed a maximum gain set as an initial specification to which the apparatus is designed.

The black stretch calculator 350 receives the input video signal Yi, the real gain GAIN_REAL calculated by the gain calculator 340, and the real tilt value TILT_REAL determined by the tilt signal generator 330 and calculates a black-stretched signal Yi' using Formula (2).

$$Yi' = \text{GAIN\_REAL} * (Yi - \text{TILT\_REAL}) + \text{TILT\_REAL} \quad (2)$$

The multiplexer 360 receives the input video signal Yi and the black-stretched signal Yi' output from the black stretch calculator 360 and selectively outputs one of the input video signal Yi and the black-stretched signal Yi' in response to the control signal received from the tilt signal generator 330. In other words, the multiplexer 360 outputs the black-stretched signal Yi' as an output video signal Yo when the received control signal has the first level and outputs the input video signal Yi as an output video signal Yo when the received control signal has the second level.

As a result, in the case of a dark screen having the mean value of the input video signal Yi less than the initial tilt value TILT, the real tilt value TILT_REAL is reduced to the mean value to reduce the range of black stretch. Thus, the slope of black stretch is varied so that black stretch can be effectively performed on the dark image to enhance contrast.

Figure 5:
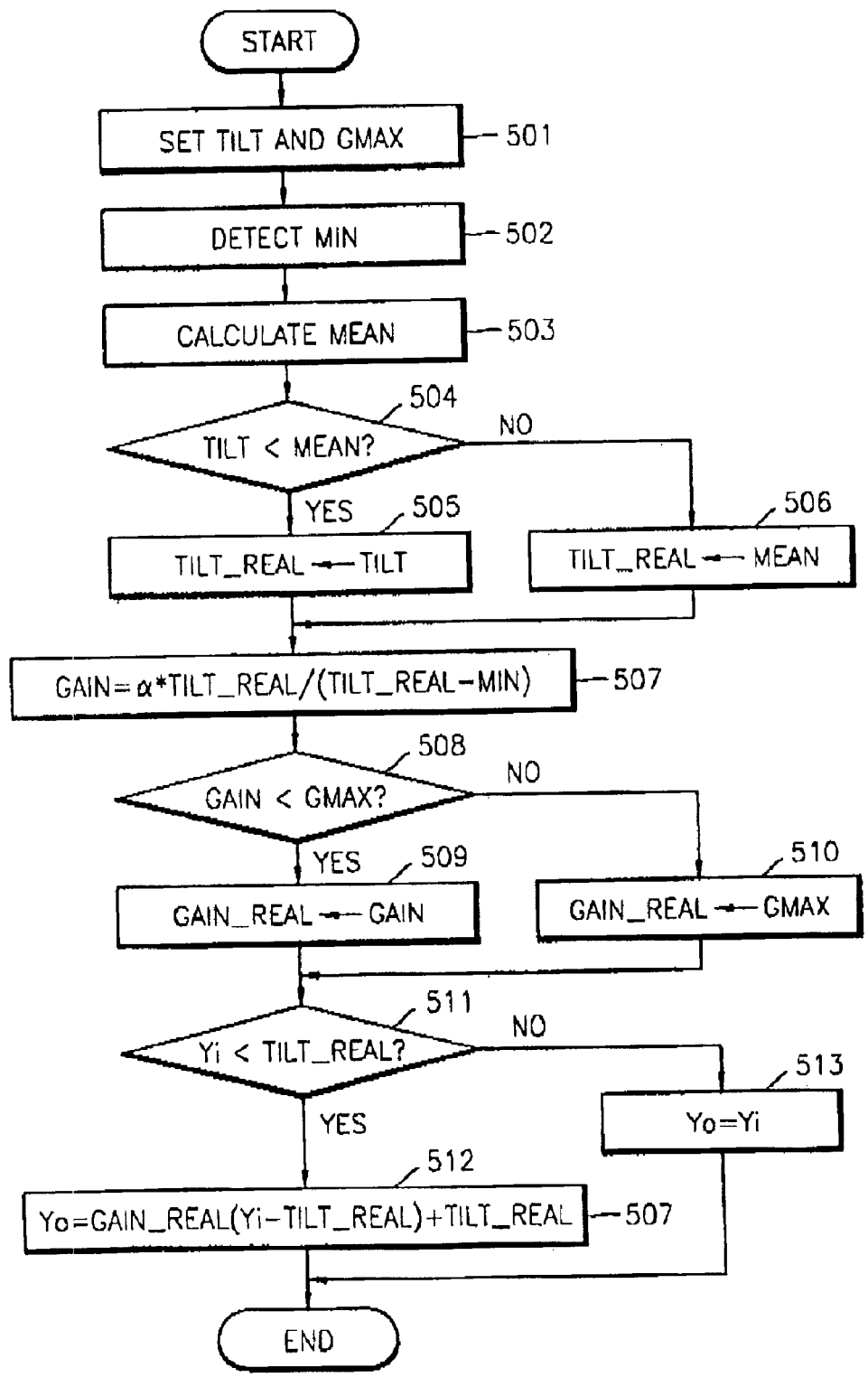
FIG. 5 is a flowchart of a method of controlling black stretch of a video signal according to an embodiment of the present invention.

Hereinafter, a method of controlling black stretch of a video signal according to an embodiment of the present invention will be described with reference to FIG. 5.

A tilt value TILT and a maximum gain GMAX are set as initial values for specifications in step 501. The tilt value TILT is used for determining the range of black stretch and indicates a threshold value of a video signal on which black stretch is to be performed, as shown in FIGS. 4A and 4B. The maximum gain GMAX indicates the maximum slope of black stretch.

Next, a minimum value MIN of an input video signal Yi is detected in units of frames or fields in step 502. The minimum value MIN may be obtained by performing horizontal and vertical filtering on the input video signal Yi or sequentially comparing luminance levels of individual pixels.

Next, a mean value of the input video signal Yi is calculated in units of frames or fields in step 503.

Next, the initial tilt value TILT is compared with the mean value of the input video signal Yi in step 504. When the initial tilt value TILT is less than the mean value, the initial tilt value TILT is determined as a real tilt value TILT_REAL in step 505. When the initial tilt value TILT is greater than or equal to the mean value, the mean value is determined as a real tilt value TILT_REAL in step 506. Consequently, the initially set range of black stretch varies with the mean value of the input video signal.

Then, a gain corresponding to the slope of black stretch is calculated using Formula (1) in step 507.

In order to limit the gain calculated in step 507 not to exceed the maximum gain GMAX initially set for specifications, the calculated gain is compared with the maximum gain GMAX in step 508. When the calculated gain is less than the maximum gain GMAX, the calculated gain is determined as a real gain GAIN_REAL in step 509. When the calculated gain is greater than or equal to the maximum gain GMAX, the maximum gain GMAX is determined as a real gain GAIN_REAL in step 510.

Thereafter, in order to determine whether the input video signal Yi is included in the black stretch control range, the input video signal Yi is compared with the real tilt value TILT_REAL in step 511.

When the input video signal Yi is less than the real tilt value TILT_REAL, that is, when the input video signal Yi is included in the black stretch range, a black-stretched signal is generated using Formula (2) as an output video signal Yo in step 512. When the input video signal Yi is greater than or equal to the real tilt value TILT_REAL, the input video signal Yi is made to bypass a black stretch control block and is output as an output video signal Yo in step 513.

As described above, according to the present invention, the slope and range of black stretch are varied depending on the mean of an input video signal, so black stretch compensation can be adaptively performed depending on the brightness of a screen. Particularly, black stretch compensation can be effectively performed on a dark image.

The present invention can be realized as a method, an apparatus, a system and so on. When the present invention is realized as software, the elements of the present invention are code segments which execute necessary operations. Programs or code segments may be stored in a processor readable medium or may be transmitted by a transmission medium or by a computer data signal combined with a carrier in a communication network. The processor readable medium may be any medium, such as an electronic circuit, a semiconductor memory device, a ROM, a flash memory, an E2PROM, a floppy disc, an optical disc, a hard disc, an optical fiber medium, or a radio frequency (RF) network, which can store or transmit information. The computer data signal may be any signal which can be transmitted through a transmission medium such as an electronic network channel, an optical fiber, air, an electromagnetic field, or a RF network.

Although the invention has been described with reference to particular embodiments, it will be apparent to one of ordinary skill in the art that modifications to the described embodiments may be made without departing from the spirit and scope of the invention. Therefore, it is obvious that the present invention is not restricted to the specific structures or arrangements shown or described in this specification.

What is claimed is:

1. An apparatus for controlling black stretch of a video signal comprising:
    a minimum detector for detecting a minimum value MIN of an input video signal Yi in predetermined image units;
    a mean calculator for calculating a mean value of the input video signal Yi in the predetermined image units; and
    a black stretch controller for varying the range of black stretch using the mean value, obtaining the slope of black stretch using the varied range of black stretch and the minimum value MIN, and performing black stretch on the input video signal Yi using the slope of black stretch.

2. The apparatus of claim 1, wherein the black stretch controller comprises:
    a tilt signal generator for comparing an initial tilt value TILT for determining the range of black stretch with the mean value calculated by the mean calculator, outputting the initial tilt value TILT as a real tilt value TILT_REAL when the initial tilt value TILT is less than the mean value, outputting the mean value as a real tilt value TILT_REAL when the initial tilt value TILT is not less than the mean value, comparing the input video signal Yi with the real tilt value TILT_REAL, generating a control signal as a first level when the input video signal is less than the real tilt value TILT_REAL, and generating a control signal as a second level when the input video signal Yi is not less than the real tilt value TILT_REAL;
    a gain calculator for receiving the minimum value MIN detected by the minimum detector and the real tilt value TILT_REAL determined by the tilt signal generator and calculating a real gain GAIN_REAL corresponding to the slope of black stretch according to a first predetermined operation;
    a black stretch calculator for receiving the input video signal Yi, the real gain GAIN_REAL, and the real tilt value TILT_REAL and generating a black-stretched signal Yi' according to a second predetermined operation; and
    a multiplexer for receiving the input video signal Yi and the black-stretched signal Yi', outputting the black-stretched signal Yi' in response to the control signal generated as the first level, and outputting the input video signal Yi in response to the control signal generated as the second level.

3. The apparatus of claim 1, wherein the predetermined image unit is a single frame.

4. The apparatus of claim 2, wherein the first predetermined operation is performed according to the formula, Gain=$\alpha$*TILT_REAL/(TILT_REAL-MIN), where $\alpha$ is constant.

5. The apparatus of claim 2, wherein the gain calculator comprises means for determining an initially set maximum gain GMAX as the real gain GAIN_REAL when the result of the first predetermined operation exceeds the maximum gain GMAX and determining the result of the first predetermined operation as the real gain GAIN_REAL when the result of the first predetermined operation does not exceed the maximum gain GMAX.

6. The apparatus of claim 2, wherein the second predetermined operation is performed according to the formula, Yi'=GAIN_REAL*(Yi−TILT_REAL)+TILT_REAL.

7. A method of controlling black stretch of a video signal comprising the steps of:
    (a) calculating a minimum value MIN and a mean value of an input video signal Yi in predetermined image units;
    (b) determining the range of black stretch by varying a real tilt value TILT_REAL using the mean value;
    (c) obtaining the slope of black stretch using the range of black stretch determined in step (b) and the minimum value MIN; and
    (d) performing black stretch on the input video signal Yi using the slope of black stretch obtained in step (c).

8. The method of claim 7, wherein the predetermined image unit is a single frame.

9. The method of claim 7, wherein the step (b) comprises the steps of:
    (b1) comparing an initial tilt value TILT for determining the range of black stretch with the mean value; and
    (b2) determining the initial tilt value TILT as a real tilt value TILT_REAL when the initial tilt value TILT is less than the mean value and determining the mean value as the real tilt value TILT_REAL when the initial tilt value TILT is not less than the mean value, thereby setting the range of black stretch.

10. The method of claim 7, wherein in the step (c), the slope, i.e., gain, of black stretch is obtained by the formula, Gain=$\alpha$*TILT_REAL/(TILT_REAL−MIN), where $\alpha$ is a constant.

11. The method of claim 7, wherein the step (d) comprises the steps of:
    (d1) comparing the input video signal Yi with the real tilt value TILT_REAL; and
    (d2) generating a black-stretched signal Yi' according to the formula Yi'=GAIN_REAL*(Yi−TILT_REAL)+TILT_REAL, where GAIN_REAL indicates the slope of black stretch, when the input video signal Yi is less than the real tilt value TILT_REAL, and passing the input video signal Yi as it is when the input video signal Yi is not less than the real tilt value TILT_REAL.

* * * * *